Oct. 21, 1941.    C. DE GANAHL    2,259,439
CONTROL VALVE
Filed Feb. 16, 1938    5 Sheets-Sheet 1
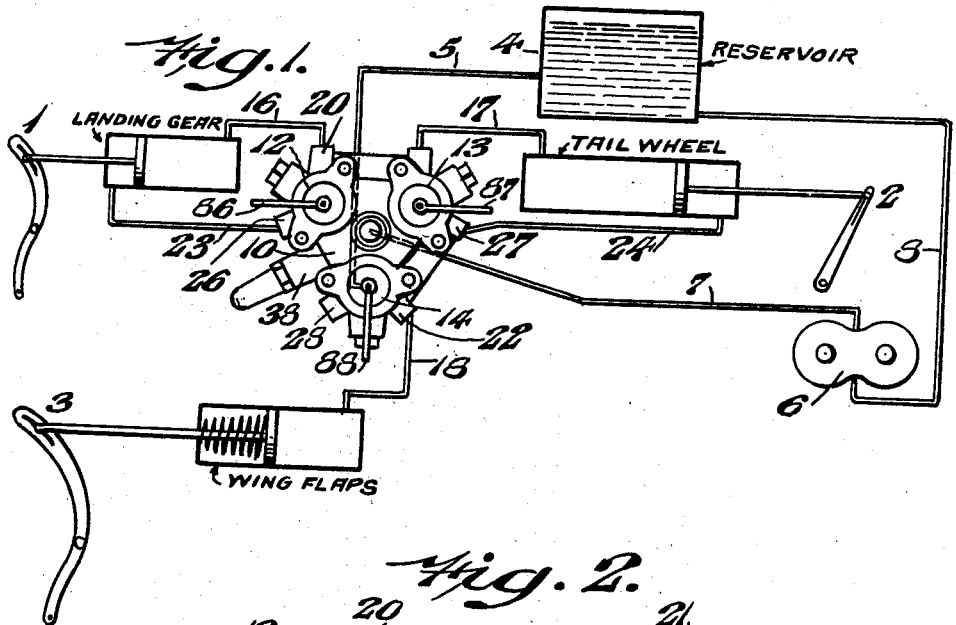
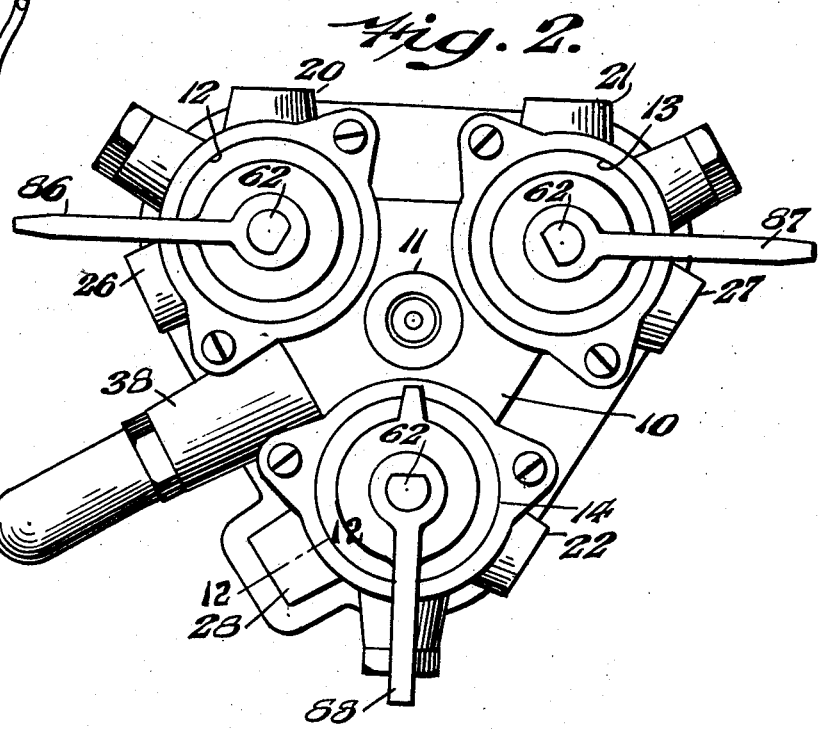
INVENTOR.
CARL DE GANAHL,
BY Frank H Borden
ATTORNEY.

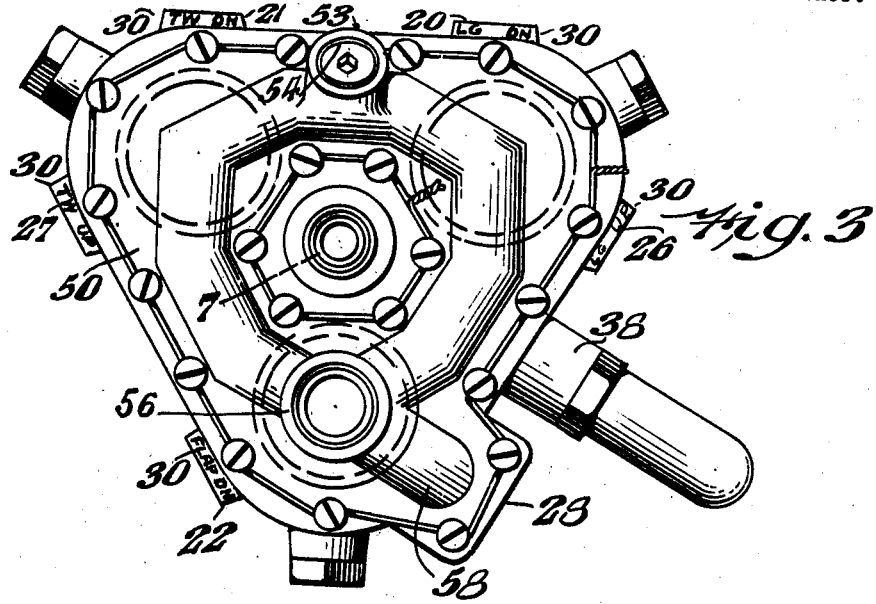
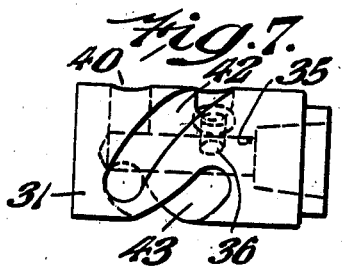
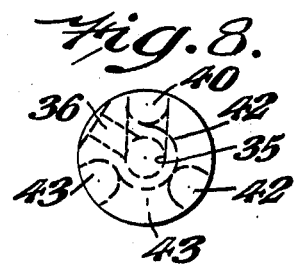
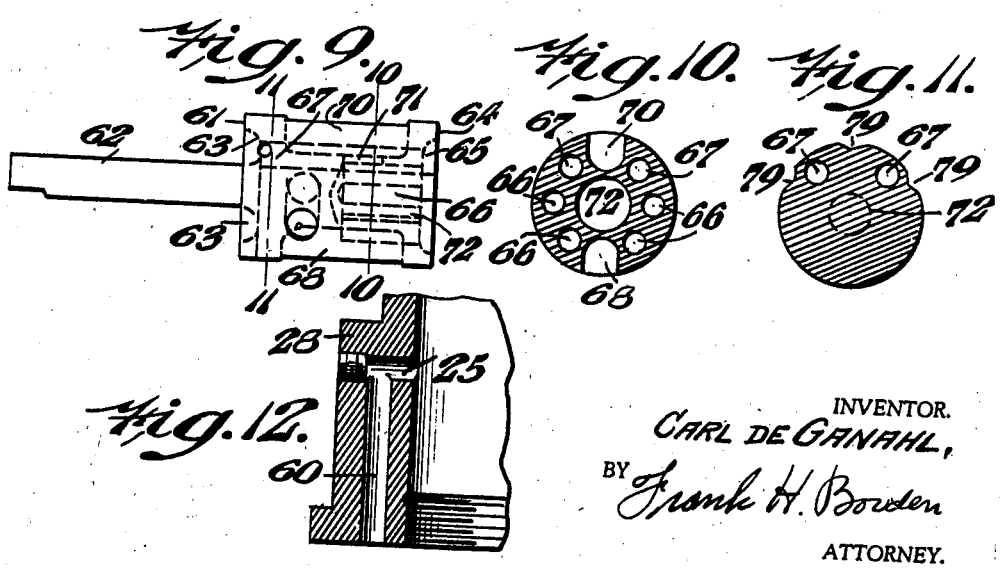

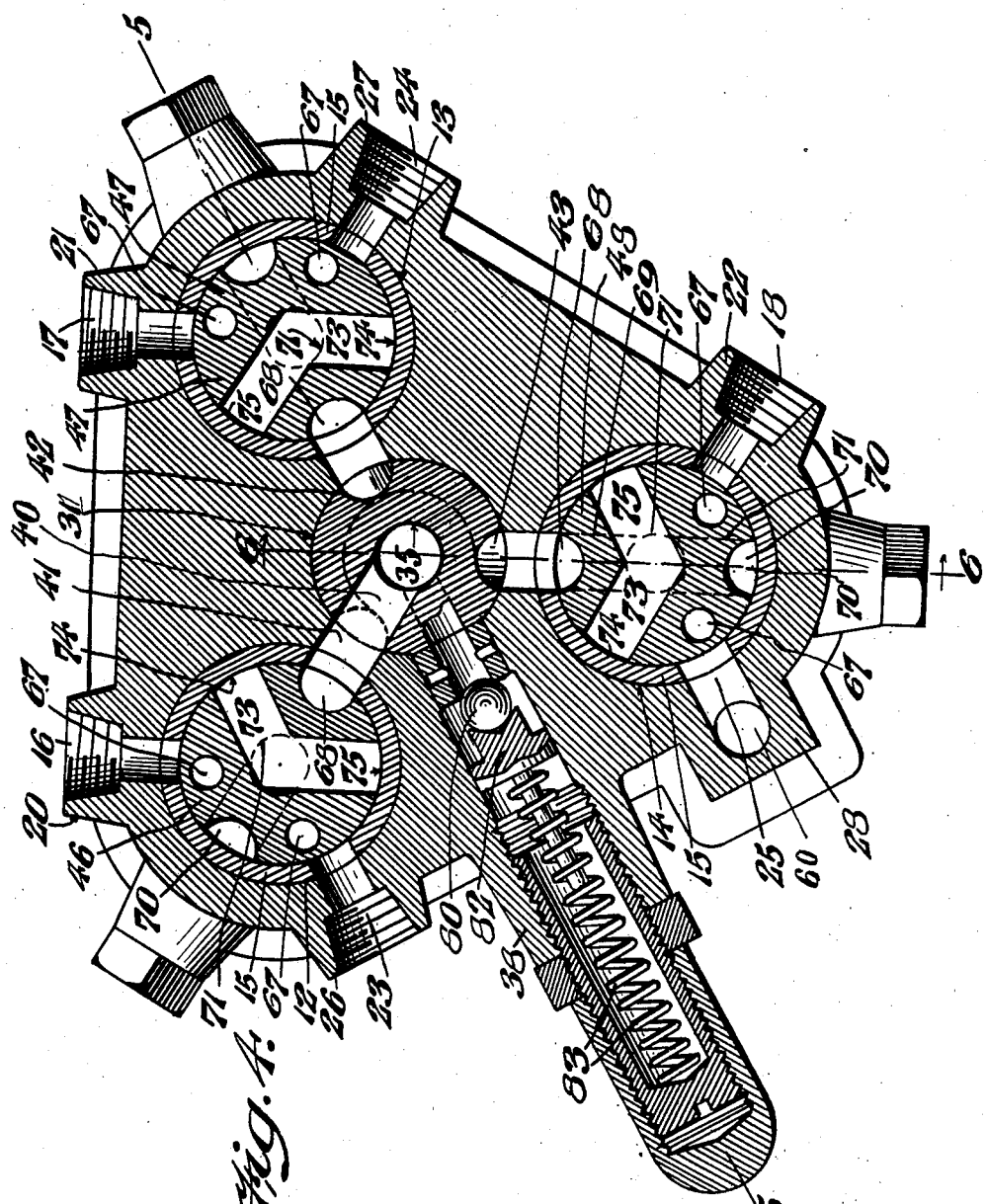

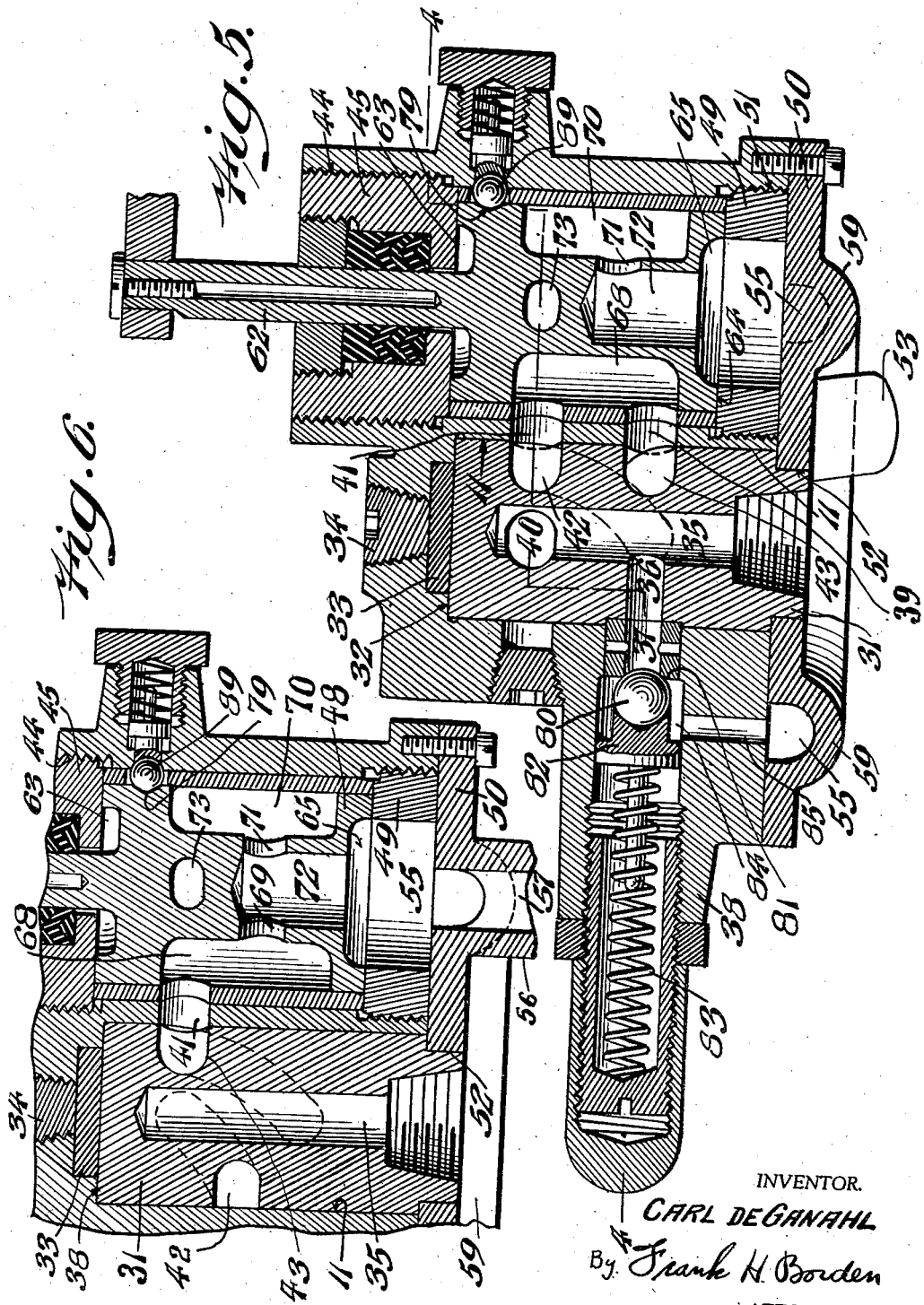

Oct. 21, 1941.    C. DE GANAHL    2,259,439
CONTROL VALVE
Filed Feb. 16, 1938    5 Sheets-Sheet 5

INVENTOR.
CARL DE GANAHL,
BY Frank H. Borden
ATTORNEY

Patented Oct. 21, 1941

2,259,439

UNITED STATES PATENT OFFICE 2,259,439

CONTROL VALVE

Carl de Ganahl, Bristol, Pa., assignor, by mesne assignments, to Reconstruction Finance Corporation Application February 16, 1938, Serial No. 190,716

2 Claims. (Cl. 277—59)

This invention relates to control valves.

There are many situations in which one or more hydraulically actuated mechanisms or agencies are to be controlled from a single source of fluid pressure or hydraulic power. Usually in the past they have relied upon the continued existence of high pressure in the hydraulic lines and in practically every known case have involved the use of a multiplicity of individual valves, of the globe type for instance, which necessitates, if not a plurality of operators, at least a plurality of disconnected valve actuations at spaced points. One of the supposedly more advanced and refined systems involves the setting of one or two valves and then the holding open by manual pressure of a valve against which the full fluid pressure in the system is built up during a long interval. Inconvenient and inefficient as all of these assemblies and practices are in ordinary situations, it will be evident that in small spaces the spreading out of the necessary number of valves is physically out of the question. In situations where the operator is busily engaged in other operations, it will be evident that prolonged attention cannot be given to operating those prior assemblies requiring such attention, and the systems are therefore impracticable, and the full benefit of hydraulic power systems cannot be realized.

A situation of small space, necessity for light and compact assemblies, and a continuously engaged operator unable to devote more time than merely sporadic moments to the control of any hydraulically actuated mechanism is found in aircraft, as an illustrative example. Similar necessities exist in various military and naval agencies, such as tanks and submarines, for example. Using aircraft as purely illustrative, as is done in the instant description, it will be clear that a number of hydraulically controlled and actuated devices may exist in a single aircraft, which requires the continuous presence of a source of hydraulic power so that actuation of a selected agency can begin instantaneously with the decision to actuate it, the several agencies each require the ability to lock same against the passage of fluid in either pressure or exhaust, and each must be selectively energizable without reference to a necessary sequence of steps or order of actuation. That is in aircraft, illustratively, any given device must be actuatable without reference necessarily to whether or not some other device has first been actuated. Furthermore each device, as a general rule, has both a positive and negative in or out or two directional actuation and control, so to speak. Illustratively, in aircraft, a retractible landing gear has two alternative controlled situations to be effected, in which the gear is either extended, then locked in extension, or retracted and locked in retraction. In actuation toward either extension or retraction there is usually a concomitant exhaust or relief of the previously entrapped fluid necessary to prevent the inadverent establishment of a lock. The control must be adapted for these several functions of hydraulic landing gears. Similarly other devices are susceptible to similar controlling functions, such, for instance, as wing flaps, bomb racks, oscillatable motor mounts for controlling the direction of the slip stream or other purposes, tail wheels or skids, wing tip floats, tail or arresting hooks, etc.

It is among the objects of this invention: to provide a multiple control valve by which selectively by a single manual manipulation a desired device is energized to a maximum hydraulic pressure without additional manipulations or attention by the operator; to provide a hydraulic system in which a low pressure hydraulic circuit is rendered available constantly for the rapid energization and build-up of suitable high pressures in a selected mechanism without continuous attention from the operator; to provide a single control means by which a desired mechanism is energized until the pressure actuates a signal pursuant to which the operator at his convenience actuates the single control to simultaneously lock the actuated device while permitting the circuit to return to low pressure circulation; to improve the art of valves; to provide a multiple control valve of extreme compactness and simplicity; to provide a control valve and system of extreme simplicity and lightness of weight with high efficiency for aircraft; to provide a hydraulic system of improved functioning for general purposes; to provide an improved, hydraulic system; and many other objects and advantages as will become more apparent as the description proceeds.

In the accompanying drawings forming part of this description:

Fig. 1 represents a diagram of the complete hydraulic system,

Fig. 2 represents a front elevation of the valve unit per se,

Fig. 3 represents a rear elevation of the valve unit,

Fig. 4 represents a transverse section taken on line 4—4 of Fig. 5, on an enlarged scale, Fig. 5 represents a section through the valve unit taken on line 5—5 of Fig. 4, Fig. 6 represents another section through the valve unit, taken on line 6—6 of Fig. 4, Fig. 7 represents an elevation of the distributing plug for the system.

Fig. 8 represents an end elevation thereof,

Fig. 9 represents a side elevation of a valve for the system,

Fig. 10 represents a section on line 10—10 of Fig. 9,

Fig. 11 represents a section on line 11—11 of Fig. 9,

Fig. 12 represents a detailed fragmentary section taken on line 12—12 of Fig. 2, on a reduced scale.

Fig. 13 represents a schematic diagram of the compound valve associated with the respective motor agencies of the complete hydraulic system according to Fig. 1, showing the series free flow through the housing and the three valve units and all of the valve units in their closed position.

Fig. 14 represents a schematic diagram of the compound valve comprising a housing and three valve units, with one valve unit illustratively controlling the "landing gear" agency so turned as to couple the free flow with an operating side of the agency, during which the return flow from the agency enters the longitudinal groove in the unit and showing the direction of flow from the housing to the "landing gear" valve unit.

Fig. 15 represents a schematic diagram of the compound valve comprising a housing and three valve units with one valve unit illustratively operative relative to the "tail wheel" agency with the selected valve turned to couple the free flow circuit with the operating side of the agency, at the same time that the return circulation from the agency enters a longitudinal channel in the unit, and showing by arrows that the circulation of the free flow is from the center of the housing through and out of the first valve unit, through the housing again and into the selected valve unit.

Fig. 16 represents a schematic diagram of the compound valve comprising a housing and three valve units, with one valve unit illustratively coupled operatively with the wing "flaps" and showing by arrows that the circulation is from the housing through and out of the first valve unit and into the housing again, through and out of the second valve unit back into the housing again, and from the housing into the third valve unit. As, in the preferred illustrative embodiment, the wing "flaps" are spring pressed toward closing position and hydraulically pressed toward opening position, there is not indicated any return to this valve unit.

As the invention will be described it will be assumed to pertain to aircraft, but it is to be clearly understood that this is purely for illustrative purposes and not for any purposes of limitation.

Mounted at some convenient point in the aircraft, such for instance as on the instrument panel, there will be provided the apertured, bored, plugged, casting or base 10, having a central cylindrical bore 11, coupled permanently to the pump or power source 6, by tube 7, and having lateral apertures to be described, and being slightly spaced from the substantially tangential relation to a plurality of operating valve cylinders, which, purely for purposes of illustration, will be three in number, and numbered respectively 12, 13 and 14. In order to minimize wear in the valve cylinders, they are each preferably provided with a steel liner sleeve or bushing 15 shrunk into place, and the bores and conduits to be described pass through the composite walls of the cylinders and bushings.

Referring to Figs 1 and 13, let it be assumed that cylinder 12 is that which controls the ejection and retraction of a landing gear control mechanism 1, cylinder 13 controls the ejection and retraction of a tail wheel, control mechanism 2, and cylinder 14 controls the ejection and permits the spring pressed retraction of wind flaps, control mechanism 3.

Each operating cylinder has an outwardly directed conduit respectively 16, 17 and 18, leading from the interior of the sleeve in the cylinder through the cast boss aligned therewith, respectively numbered 20, 21 and 22, and leading to the "down" side of the respective hydraulic agencies, and the connections are such that fluid under pressure passing through any of the said conduits from within the cylinder communicating therewith secures the ejection of the appropriate agency. Similarly each cylinder has an outwardly directed conduit, respectively numbered 23, 24 and 25, passing from within the respective cylinders through the respective aligned bosses 26, 27 and 28, each of which, except conduit 25, leads to the "up" side of the respective hydraulically actuated agencies. As the wing flaps happen to be actuated in one direction only, the conduit 25 does not extend completely through the boss 28 to the hydraulic gear for the wing flap, but has a "short circuiting" connection directly with the oil or fluid reservoir 4, to be described.

It is a feature facilitating the installation of the assembly in an aircraft, that the rear faces of the respective bosses are bevelled or tapered as at 30 so as to provide a substantially plane surface upon which identifying data, such as "T. W. dn." and "L. G. up", etc. can be inscribed so that mechanics can couple the connections from the respective agencies directly to the appropriate bosses from the sides or rear and without reference to the front without delay or difficulty.

Within the central cylindrical bore 11 there is shrunk and permanently anchored a bored and apertured plug 31, held against movement or leakage by endwise engagement against the internal shoulder 32, and the gasket 33 and plug 34. The plug 31 has a substantially concentric axial bore 35 intersected by the lower or median transverse bore 36 leading to the relief valve passage 37 in the enlarged boss 38 of the main casting. A transverse bore 40 toward the upper or front end communicates with the concentric axial bore 35 and leads radially out of the plug through a registering port 41 in the wall between the operating cylinders 11 and 12, leading into the cylinder 12 toward the front or upper end thereof. In this connection the words "front" or "upper" refer to the side turned toward the operator in mounted position, regardless of its actual position, while obviously "rear" or "down" and the like mean the opposite side of the assembly. The plug 31 has a plurality, and illustratively two, partially helical or spiral external grooves, respectively 42 and 43.

In view of the provision of three control cylinders but two spiral grooves are provided and each extends substantially 120° peripherally, so as to leave a space of approximately 120° having no groove, but only the transverse relief valve aperture or bore 36, previously described. It will be understood that the peripheral extent and numbers of the helical grooves will depend upon the number of control cylinders to be associated in the assembly. Thus if but two operating cylinders are used there will be one groove for approximately one half the peripheral extent of the plug. On the other hand if four cylinders are used, there will be three such grooves, each extending peripherally for approximately 90°. In each case however it is to be noted that the helical grooves are disposed so that their adjacent ends are in overlapping relation in a line longitudinally of the plug. Thus groove 42 begins at the lower end of the plug in spaced but substantial axial or longitudinal alignment with the lateral bore 40, communicating with the central bore of the plug, and ends toward the upper end of the plug in spaced longitudinal alignment with the beginning of the adjacent groove 43 toward the lower end of the plug.

Each operating cylinder is enlarged on each side beyond the sleeve or bushing 15. Toward the front it is enlarged as at 44 to receive a packing gland 45, through the center of which the shank of an oscillatory valve extends through the front of the assembly for actuation by the operator, through a suitable handle 86, 87 or 88 as later recited. Valve element 46 is disposed in the bushing 15 of the landing gear control cylinder 12, valve element 47 in tail wheel cylinder 13, and valve element 48 in wing flap cylinder 14. The valve elements are held in place by the tubular plugs 49 in the rear enlargement, engaged by rear cover plate 50 having the substantially central hole 52 through which the reduced end of the plug 31 extends to permit connection of a supply conduit for the intake of fluid under a low static head, as will be described. The cover plate has the angularly divergent boss 53 axially bored with a channel 54 and suitably plugged as to facilitate bleeding of air from the system in filling same with fluid such as oil. The channel 54 leads to a channel 55 formed as a single continuous or discontinuous groove in the face of the back plate in the enlarged substantially annular protuberance 59 of the plate 50, substantially concentric of the axial opening 52. A second rearward boss 56 has an aperture 57 communicating with the channel 55 connected by a conduit 5 with reservoir 4. The channel 55 has a tail extension 58 extending over the boss 28 of the casting, and in communication with the channel or conduit 25 therein, by means of the longitudinal bore 60 in said boss 28. Although the channel 55 is shown as interrupted by cross webs for strength, it will be understood that these webs are in the substantial center of the tubular bores of the plugs 49, so that the channel, although in effect dipping into such plugs, is continuous across the ends of all three control cylinders.

Each valve element in the respective operating or control cylinders has an end surface 61 from which the control shank 62 emerges concentrically, and the shank is surrounded by the annular groove or recess 63 in the front or top end of the valve. The rear end of the valve has a plane face as at 64 at the periphery thereof, and is axially centrally recessed as at 65. A series of longitudinal bores extend partially through the valve for lightness as at 66, while two, illustratively and preferably, extend longitudinally entirely through the element in communication with the respective annular recesses 63 and 65, to form balancing passages 67 to insure that in the event of any casual leakage about the valve ends, no pressure is built up, as, through the communication channels 67, the valve ends are in direct and continuous communication with the peripheral passage or channel 55 leading to the vented reservoir 4 which has no pressure other than the slight gravity head of the open reservoir. This minimizes the chances for difficulties with the assembly as the pressures cannot build up in undesired places, and especially is the pressure removed from the packing glands 45 surrounding the shanks 62, and the front of the assembly especially is therefore always free from danger of leakage, as indeed is the rest of the assembly. This is in marked contrast to the common practices of the past in which leakage along the shanks of the valves was almost inevitable, owing to the exposure thereof to the high pressures of the systems.

The valve elements have a tight fit at their ends in the cylindrical bushings, to minimize leakage, and each has a pair of diametrically spaced longitudinally extending grooves, respectively 68 and 70, on opposite sides of the element of a length substantially the same as the longitudinal extent of the respective partial helical grooves in the central plug 31. The longitudinal channel 70 of each valve has communication with a radial bore 71 extending inwardly to communication with an axial bore 72 in the valve element, which in turn is in constant communication with the aperture in the annular plug 49 and with the common reservoir-leading annular channel 55. In addition valve 48 has a transverse radial bore 69 leading from longitudinal groove 68 into the central axial bore 72.

Each valve element has a transversely extending divergent or V shaped bore 73 having mouths in the cylindrical periphery of the valve element at 74 and 75. The angle of the transverse or shunt passage 73 is preferably although obviously not necessarily substantially bisected by a diametrical plane passing symmetrically through the laterally disposed longitudinally extending grooves or passages 68 and 70. Each valve element has three arcuately spaced detent recesses 79 to receive and seat selectively the spring pressed pawl or detent 89 in predetermined valve positioning as will be clear.

The relief valve previously mentioned as mounted in the large boss 38 of the assembly may be of any desired construction, but preferably utilizes a ball 80 pushed toward a seat 81 by a plunger 82 resiliently pushing against the ball by a preloaded compression spring 83, and the arrangement is such that when the pressure reaches that which is sufficient to unseat the ball, the ball valve opens and then the assembly chatters or otherwise makes audible indication of the existence of the predetermined condition of pressure for which it is set. A relief passage 85 communicates with the enlarged chamber 84, containing the ball in the passage 37, and leads to the reservoir leading conducting channel 55, as will be clear.

In the operation of the invention it will first be assumed that each handle of the respective handles 86, 87 and 88 of the respective valves has been turned to a position of "lock," which is intermediate the on and off, or "up" and "down" indications with the pawls in the central detent recesses 79. Let it be assumed that a gear or other type of pump or impellor 6 is being continuously driven to furnish a circulatory low pressure stream of fluid delivered to the central bore 35 in the fixed plug 31 in the central cylinder of the assembly by a supply line 8 extending from the reservoir 4.

As will be seen in Fig. 13, the circulating stream advances through the central axial bore 35, then laterally through the transverse port 40, through the registering port 41, between the central cylinder and the first control cylinder 12, into the upper end of the juxtaposed longitudinal groove 68 in the valve element 46, then downwardly in said groove to the lower end thereof, where it passes laterally through a lower port 39, between the central cylinder 11 and the control cylinder 12, and into the lower end of the spiral or partially helical groove 42. At this juncture, as the second, tail wheel control valve element 47, is in the "lock" position, the longitudinal groove or external channel 68 thereof is in registering position with the respective upper port 41 and the lower port 39 extending between the cylinders 11 and 13. As the upper end of the helical groove 42 terminates in the lateral port 41, and the lower end of the helical groove 43 terminates in registration with the longitudinally aligned lateral port 39, the flowing fluid is guided through the spiral groove 42, through the longitudinal or vertical channel 68, through the spiral groove 43. As at this juncture also the third, wing flap valve element 48, is turned to the "lock" position, its longitudinal slot or channel 68 registers with upper port 41 at the end of the spiral groove 43, so that the flowing fluid passes downwardly through the said channel 68 of the valve element 48, then inwardly through the previously noted radial bore 69 into the internal axial bore 72 of the valve element, then outwardly longitudinally of the valve element through recess 65 and through the aperture in the plug and into the reservoir leading channel 55 and through tube 5 to the reservoir 4. It will be obvious that in the closed circuit thus traversed by the flowing fluid there is no wear on or leakage from the parts, no head of pressure is developed and there are no appreciable power demands during the static functioning of the assembly. That the pressure is extremely low during this phase of the functioning will be apparent, as will the advantages of such low pressure system.

Assume now that a landing is being contemplated and that preparations therefor will include serially the extension of the landing gear, its locking, then the extension of the tail wheel and its locking, and lastly, the actuation of the wing flaps and their locking.

The attention of the operator need only be diverted from his other duties for an instant while he swings the selected valve element 46 in cylinder 12 by its handle 85, from the position "lock" to the position "down," and thereafter resumes the conduct of his other affairs until an audible or other signal indicates that the pressure has reached a point beyond that necessary to extend the landing gear to its utmost, pursuant to which it is the work of but another instant at a moment accorded at the discretion of the operator in due course, to return the valve element to the position "lock," and the landing gear will be hydraulically locked against undesired collapse or retraction.

As will be observed in Figs. 1, 13, and 14, the occurrences following upon the swinging of the valve 46 are as follows: the longitudinal slot 68 on one side that has been registering with the outlet 40 from the pressure line and conveying fluid from it as part of the low pressure system, is now moved arcuately away so as to be in confronting relation only with the inner cylindrical surface of the cylinder 12, and synchronously the angular transverse shunt passage 73, which had opened only upon the closed inner surface of the sleeve 15 of the cylinder 12, is brought to registering relation of mouth 73 with the intake of fluid pressure through orifice 41, and simultaneously the opposite mouth or orifice end 74 is moved into registration with the outlet passage 16 leading to the "down" side of the landing gear actuating hydraulic gear, and the "building up" of pressure in that line begins. It is worthy of note that simultaneously the longitudinal slot or channel 70 which had been juxtaposed to the inner surface of the cylinder 12, or the bushing 15 thereof, is moved about to registration with the "up" conduit 23, and acts as a leakaway or exhaust therefrom through which fluid on the inert side of the piston of the hydraulic gear is caused to move. As channel 70 has the radial bore 71 leading to the interior bore 72 in the valve element, and the latter leads to the reservoir, as will be clear, this part of the function will be readily understood. It will be clear that the normally low pressure line comprising pump 6, tube 7, plug 31 and lateral bore 41, gradually, or rapidly, according to capacities, builds up to an operating pressure which is quite adequate for the landing gear extension purpose, and as the relief valve is in the same line, the pressure ultimately reaches a point where the relief ball can be unseated to permit the excess pressure liquid to pass about the ball valve, through the relief by-pass 85, to the reservoir channel 55, tube 5, to reservoir 4.

It will be understood that as soon as the landing gear has been extended to its utmost point, the operator may swing the valve element again to "lock" position, at which the valve parts will return to the positions previously held. As at this latter point the inner or cylinder ends of both the passage 16 and 23 will be closed by solid portions of the valve element, the hydraulic column that had been built up in line 16 is still maintained solidly, to prevent any movement of the landing gear toward retraction. This may well enable the use of certain types of landing gears which have not been previously available, owing to the previous necessity for mechanically locking the gear in an extended position. Obviously it makes no particular difference what sort of landing gear is used with the instant invention, and obviously also the hydraulic lock obtainable herewith is most positive.

With the landing gear locked down, similar actuation of the valve element 47 will effect the extension and locking of the tail wheel, as will be clear from Figs. 1, 13, and 15.

The final movement, of valve 48, to secure extension of the wing flaps will obviously be just like the others if the piston arrangement is two way under pressure as will be clear from Figs. 1, 13, and 15. The suggested form of one way piston, and the other way spring extension presents no additional problems, as the only difference between this control and the others is the fact that, as noted, each of the longitudinal slots or grooves 68 and 70 has a radial transverse bore communicating with the central return circuit reservoir-leading channels. To return the flap to locked retracted position following extension it will be necessary merely to move the valve element 48 in the same manner as with the others, but with slightly different coupling of passages. There is not a power driven "up" position in the illustrative case and the only requirement for return is that while the conduit 25 is coupled to the power outlet from the transverse by-pass 73 (the other end engaging the intake from the upper end of groove 43 in plug 31), the exhaust or leakaway from power conduit 18 enters longitudinal channel 70 and through port 71 to the reservoir aligned internal bore 72 thereof. The power build-up stops immediately the valve is swung, as channel 25 leads directly to the reservoir channel. This should be clear.

The advantages of the invention will be obvious. It is clear that it will be available for the control of a single agency, as well as a plurality, and that many modifications may be made in the assembly without departing from the spirit of the invention, and all such are to be construed as within the scope thereof unless otherwise specifically limited in the appended claims.

I claim as my invention:

1. In control valves, a housing having substantially parallel front and rear plates, a plurality of valve elements mounted oscillatably in the housing and disposed between the plates, the valve elements all being parallel to each other and disposed symmetrically about and parallel to a common axis generally normal to said plates, said housing having a bore extending concentrically of the common axis, each valve having a pair of spaced longitudinally extending grooves each parallel to said axis and each having a transverse ported passage with the ends thereof disposed between the respective grooves, the axes of all of said passages lying in a common plane intersecting all of said grooves, a fluid free stream passage being formed in said housing and valves comprising passages formed in said housing inclined relative to said common axis as well as to said plates establishing communication between the front plate ends of the grooves of a pair of valve elements respectively and the rear plate ends of the grooves of a second mentioned pair of valve elements, one valve element being common to both the first and second mentioned pairs of elements, said housing having a passage extending between said axial bore and an end of a groove of a valve of the first pair mentioned, one of said valve elements having an axial bore having a transverse port communicating with one of its grooves, conduit means communicating respectively with the axial bore in the housing and said last mentioned axial bore in the valve element to establish free flow through the valves in series.

2. In control valves, a housing having substantially parallel front and rear plates, a plurality of valve elements mounted oscillatably in the housing and disposed between the plates, the valve elements all being parallel to each other and disposed symmetrically about and parallel to a common axis generally normal to said plates, said housing having a bore extending concentrically of the common axis, each valve having a pair of spaced longitudinally extending grooves each parallel to said axis and each having a transverse ported passage with the ends thereof disposed between the respective grooves, the axes of all of said passages lying in a common plane intersecting all of said grooves, a fluid free stream passage being formed in said housing and valves comprising passages formed in said housing inclined relative to said common axis as well as to said plates establishing communication between the front plate ends of the grooves of a pair of valve elements respectively and the rear plate ends of the grooves of a second mentioned pair of valve elements, one valve element being common to both the first and second mentioned pairs of elements, said housing having a passage extending between said axial bore and an end of a groove of a valve of the first pair mentioned, one of said valve elements having an axial bore having a transverse port communicating with one of its grooves, conduit means communicating respectively with the axial bore in the housing and said last mentioned axial bore in the valve element to establish free flow through the valves in series, said housing having pressure supply outlet ports for each valve element normally closed by said element and having an axis lying substantially in said common plane, and each valve being so arranged that upon oscillation to an adjusted position the transverse ported passage thereof will replace the groove initially communicating with said inclined housing passage to engage one end of the transverse passage with the latter while the other end establishes communication with the respective pressure supply outlet ports to direct pressure flow to said power outlet.

CARL DE GANAHL.